Jan. 10, 1933.  J. R. HAINES  1,894,173
REAR MOTOR VEHICLE SIGNAL
Filed May 3, 1930
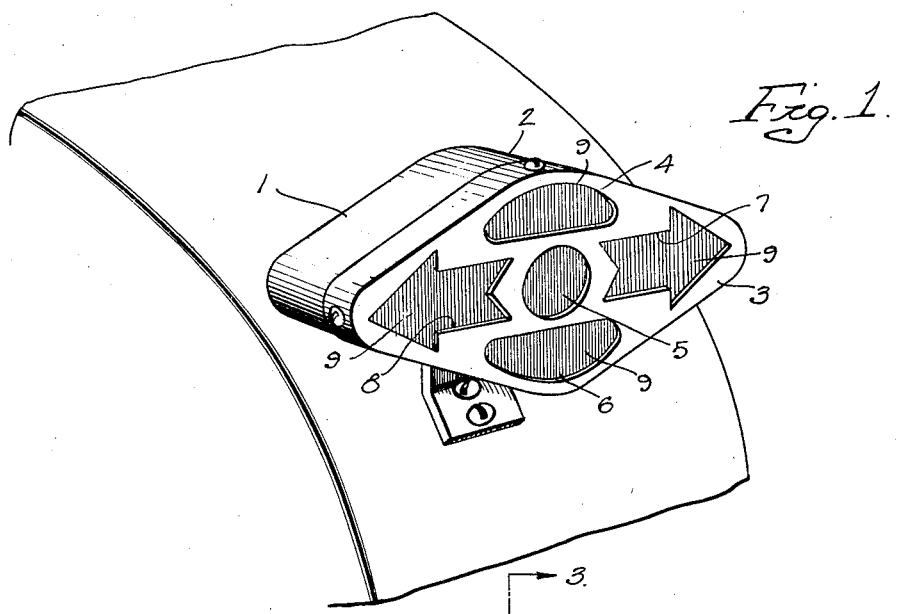
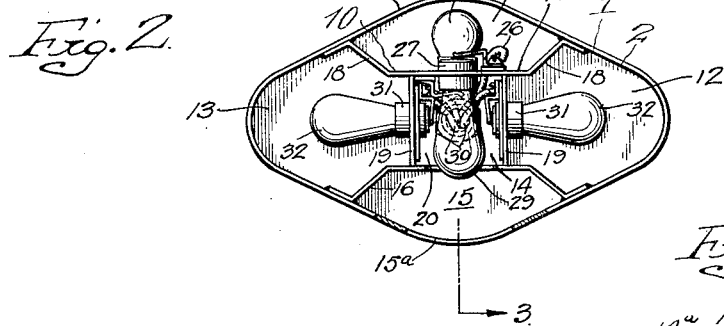
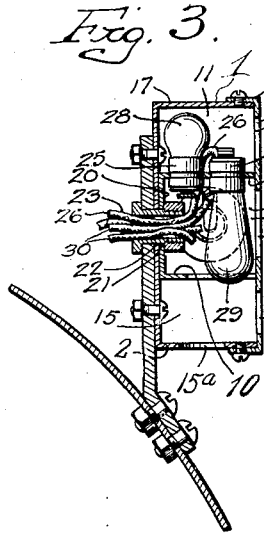
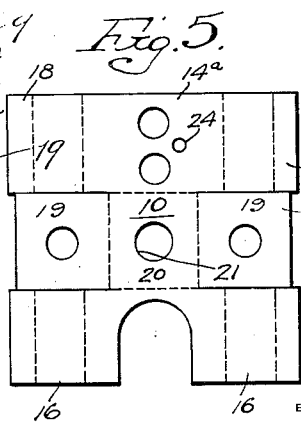
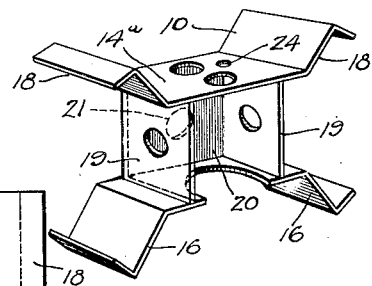
John R. Haines
INVENTOR
BY Victor J. Evans
ATTORNEY Patented Jan. 10, 1933

1,894,173

UNITED STATES PATENT OFFICE

JOHN R. HAINES, OF VINCENTOWN, NEW JERSEY, ASSIGNOR TO ARROW SAFETY DEVICE COMPANY, INC., OF MOUNT HOLLY, NEW JERSEY, A CORPORATION OF NEW JERSEY

REAR MOTOR VEHICLE SIGNAL

Application filed May 3, 1930. Serial No. 449,621.

This invention relates to an improved rear motor vehicle signal, and especially to a housing or casing for signals.

The purpose of the invention is to provide, in a rear motor vehicle signal housing, a casing divided into five compartments, two of the compartments including lighted reflecting signal arrows for right and left turns, a compartment with a lens for stop, the other two compartments including a single bulb and two lenses or transparencies, one being clear namely uncolored, the light rays from which reflect rearwardly for lighting up the road in case of backing, the other colored red acting as a tail light, and both accommodating the light rays from the single bulb. The housing is also provided with an opening in its bottom wall, so that the light rays from the single bulb for the clear light and tail light may reflect upon the usual license tag, usually carried below the signal housing.

The essential purpose of this invention is to cause the formation of these several compartments, through the medium of a partitioning wall or element constructed from a single piece of sheet metal, so formed and mounted in the casing as to divide it into a compartmental structure, adapted for the purpose stated above, three of the compartments being one above the other centrally of the casing, the other compartments being formed in the ends of the casing.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a perspective view of the rear signal housing constructed in accordance with the invention.

Figure 2 is a view of the rear signal housing showing a partition in a single piece of die stamped or otherwise formed metal to divide the casing into four compartments as above outlined.

Figure 3 is a vertical sectional view on the line 3—3 of Figure 2.

Figure 4 is a view of the partition in a single piece.

Figure 5 is a view of the blank to form the single partition.

Referring to the drawing, 1 identifies a rear signal housing or casing, which comprises a body 2, which can be any contour and proportions, preferably approximating a diamond contour, the several corners being preferably rounded. A cover 3 fits the body 2 and is provided with openings 4, 5 and 6, and 7 and 8. The openings 4, 5 and 6 are formed in the cover 3 in vertical positions one above the other. The central opening 5 is covered by a clear or uncolored transparency. The upper opening 4 in the cover 3 is covered by a red transparency as shown in Figure 1 to denote stop, while the lower opening 6 is covered by a red transparency denoting a tail light.

The openings 7 and 8 are of contours representing arrows for indicating right and left turns and are covered by transparencies colored red. These various transparent covered openings register with the various compartments of the compartmental housing. The various transparencies 9 may be constructed of any suitable material, glass or celluloid, or the like. The central opening 5 with its clear uncolored transparency permits a white light to reflect rearwardly for the purpose of lighting up the road in case it is desired to back the vehicle. The lower wall of the compartmental housing has an uncovered opening 15a so that the light rays from the bulb in the compartment 14 may reflect upon the license plate carried below the signal.

Mounted on the interior of the body 2 of the casing or housing is a partitioning structure 10 produced from a single blank, as shown in Figures 2, 3 and 4, cut and bent in the manner shown in the drawing, so that when the partitioning structure is mounted in the body of the housing and secured in position, it divides the body of the housing into five compartments 11, 12, 13, 14 and 15, the compartments 12 and 13 are coincident to the right and left turn indicating arrows, while the compartments 11, 14 and 15 are coincident to the openings 4, 5 and 6. The compartment 14 is just above the compartment 15 with its side walls resting upon an arched wall 16 of the compartment 15. A portion 17 of the housing, which is spaced above the upper wall 14a of the compartment 14, constitutes a dome. The compartment 14 is incident to the opening 5.

This partitioning structure comprises the upper wings 18 which are brazed or otherwise secured to the upper wall of the body of the housing, as shown, there being an arched wall such as 16 integral with the one piece partition blank, said arched wall 16 being secured to the bottom of the housing or casing. The lower portion of the compartment 14 has its side walls 19 formed integral with the one piece blank partitioning structure.

One wall 20 of the compartment 14 has an opening 21 registering with an opening 22 in the front wall of the body of the housing, and these registering openings contain a bushing for the passage of wires 23, one of which is connected to a socket 25 mounted in said wall 14a, while another 26 of the wires 23 passes through an opening 24 in the wall 14a and is connected with a socket 27 facing toward the compartment 15, there being bulbs 28 and 29 mounted in the sockets 25 and 27 for lighting the compartments 11, 14 and 15.

Other wires 30 connect to the sockets 31 which receive bulbs 32 for lighting the compartments 12 and 13.

All of the various wires 23 may include a circuit (not shown), whereby the various bulbs 28, 29 and 32 may be lighted individually for illuminating the compartments and thereby reflecting through the various transparencies 9.

The invention having been set forth, what is claimed is:

1. A signal casing of compartmental form comprising a shell, and a partitioning member disposed within the shell, the partitioning member being formed from sheet metal slit on parallel lines and from opposite ends, those portions on opposite sides of the slits being bent into parallelism and those portions between the slits being likewise bent into parallelism to occupy planes at right angles to the planes of the first said portions to define a center compartment, those portions of the blank extending beyond the second said portions being bent to engage the top and bottom walls of the shell and to define with the latter a series of compartments in surrounding relation to the center compartment.

2. A signal casing of compartmental form comprising a shell, and a partitioning member disposed within the shell, the partitioning member being formed from sheet metal slit on parallel lines and from opposite ends, those portions on opposite sides of the slits being bent into parallelism and those portions between the slits being likewise bent into parallelism to occupy planes at right angles to the planes of the first said portions to define a center compartment, those portions of the blank extending beyond the second said portions being bent to engage the top and bottom walls of the shell and to define with the latter a series of compartments in surrounding relation to the center compartment, one of the first said portions where it defines the bottom wall of the center compartment being cut away to provide light communication from the center compartment to the compartment just below it.

3. A signal casing of compartmental form comprising a shell, and a partitioning member disposed within the shell, the partitioning member being formed from sheet metal slit on parallel lines from opposite ends, those portions on opposite sides of the slits being bent into parallelism and those portions between the slits being likewise bent into parallelism and in between the first portions to occupy planes at right angles to the planes of the first said portions to define a central compartment, those portions of the blank extending beyond the second said portions being bent to engage the top and the bottom walls of the shell and to define with the latter a series of compartments in surrounding relation to the central compartment, the first and second bent portions respectively having openings for the reception and mounting of bulb sockets, the bulbs adapted for illuminating the several compartments.

4. A signal casing of compartmental form comprising a shell, and a partitioning member disposed within the shell, the partitioning member being formed from sheet metal slit on parallel lines from opposite ends, those portions on opposite sides of the slits being bent into parallelism and those portions between the slits being likewise bent into parallelism and in between the first portions to occupy planes at right angles to the planes of the first said portions to define a central compartment, those portions of the blank extending beyond the second said portions being bent to engage the top and the bottom walls of the shell and to define with the latter a series of compartments in surrounding relation to the central compartment, the first and second bent portions respectively having openings for the reception and mounting of bulb sockets, the bulbs adapted for illuminating the several compartments, a support for the shell, and means engaging through a certain wall of the central compartment and through the wall of the shell and the support for mounting the foregoing structure and holding the partitioning member rigid.

In testimony whereof he affixes his signature.

JOHN R. HAINES.